United States Patent
Ang

(10) Patent No.: US 8,140,108 B2
(45) Date of Patent: Mar. 20, 2012

(54) WEBSITE THEME CHANGING USING A MOBILE DEVICE

(75) Inventor: John E. Ang, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 710 days.

(21) Appl. No.: 11/955,763

(22) Filed: Dec. 13, 2007

(65) Prior Publication Data

US 2009/0156250 A1    Jun. 18, 2009

(51) Int. Cl.
*H04M 1/00* (2006.01)
*H04W 4/00* (2009.01)
*H04B 1/38* (2006.01)

(52) U.S. Cl. ............... 455/550.1; 455/466; 455/566

(58) Field of Classification Search ............ 455/550.1, 455/466, 566
See application file for complete search history.

(56) References Cited

U.S. PATENT DOCUMENTS

| | | | |
|---|---|---|---|
| 2005/0070259 A1* | 3/2005 | Kloba et al. | 455/414.2 |
| 2006/0019699 A1 | 1/2006 | Chang et al. | |
| 2006/0148522 A1* | 7/2006 | Chipchase et al. | 455/557 |
| 2006/0173911 A1* | 8/2006 | Levin et al. | 707/104.1 |
| 2007/0213004 A1 | 9/2007 | DaCosta | |

OTHER PUBLICATIONS

International Preliminary Report on Patentability, corresponding to International Patent Application No. PCT/US2008/068745, dated Mar. 23, 2010.
Hall, J. "Weblogs and Mobile Weblogs" Internet Citation, [Online] XP002448895, Retrieved from the Internet: URL: http://www.3nw.com/pda/bleeding_edge/mobile_weblogs.htm> [retrieved on Aug. 30, 2007].
International Search Report, corresponding to International Patent Application No. PCT/US2008/068745, dated Nov. 4, 2008.
Written Opinion, corresponding to International Patent Application No. PCT/US2008/068745, dated Nov. 4, 2008.

* cited by examiner

*Primary Examiner* — Marisol Figueroa
(74) *Attorney, Agent, or Firm* — Sreenivas Vedantam; Moore & Van Allen, PLLC

(57) ABSTRACT

An apparatus and method for changing a theme of a website automatically. A mobile device includes a processor and a memory. The memory contains an application for detecting the selection of a theme and automatically changing a theme of a website to the selected theme. Information related to the selected theme may be transferred to the website using a wireless protocol such as MMS, WAP, etc. The website may be a blog site, a social networking site, or a personal website. The selected theme may include information related to music, alerts, wallpaper, text, videos, pictures, or virtual card file (VCF) information.

20 Claims, 6 Drawing Sheets

WEBSITE THEME CHANGING USING A MOBILE DEVICE

BACKGROUND OF THE INVENTION

The present invention is related to website themes, and more specifically to automatic website theme changing using a mobile device.

Currently, with the popularity of various types of websites such as blog sites and social networking sites, many people have or maintain a website with their own personalized information and design. Many times, these websites are customized with information, pictures, blogs, etc. from a particular user. Similarly, many people today have mobile devices such as cellular phones, personal digital assistants (PDA), or other wireless devices where people customize the settings on these mobile devices by setting up different themes. Each specific theme file may designate particular information such as background, wallpaper, music or audio, alerts, text, etc. A user may have multiple theme files stored on their mobile device allowing them to select and change different themes based on mood, time of day, current situation, or any other reason. However, to change a theme of a website, a user must be physically located in front of a computer allowing access via a browser to the website. A user may desire that the website have a theme the same as the theme on the mobile device, however, currently, there is no way for a user to select a theme from a mobile device and have this theme implemented on their personal website.

BRIEF SUMMARY OF THE INVENTION

According to one aspect of the present invention, a mobile device includes a processor and a memory. The memory containing an application for detecting the selection of a theme and automatically changing a theme of a website to the selected theme.

According to another aspect of the present invention, a method for changing a theme of a website automatically includes selecting a theme on a mobile device, and automatically changing a theme of a website to the selected theme.

According to a further aspect of the present invention, an apparatus comprising a storage medium with instructions stored therein, the instructions when executed causing a processing device to perform selecting a theme on a processing device, and automatically changing a theme of a website to the selected theme.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
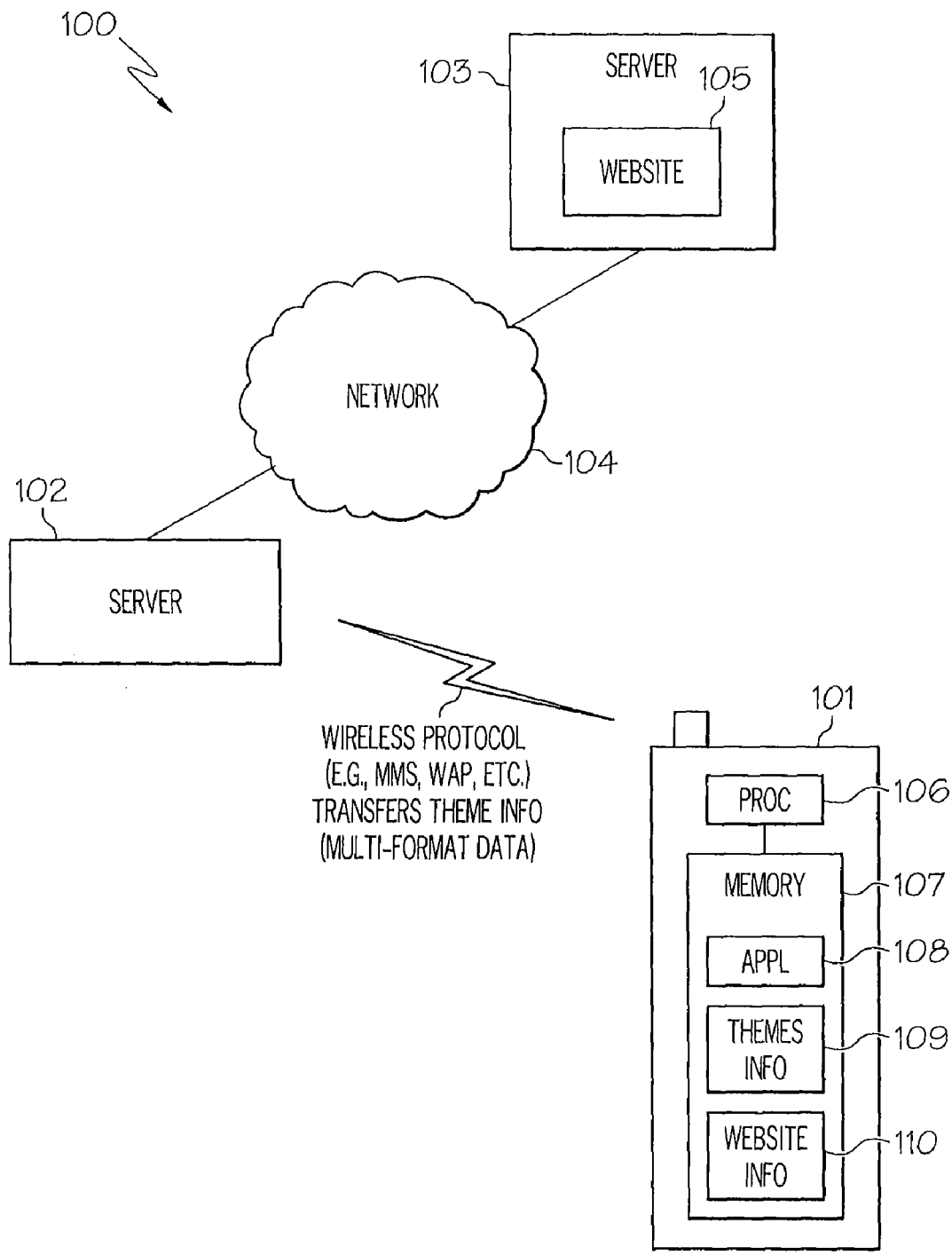
FIG. 1 is a system for website theme changing using a mobile device according to an example embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the present invention, themes may be selected on a mobile device and automatically incorporated on a website such as a blog site, social networking site, etc. A theme file may contain various types of information related to wallpaper or background, audio or music, videos, text, alerts, etc., where each of these may be in a different type of format. The multi-formatted data may take any various types of forms such as, for example, Moving Picture Experts Group 4 (MPEG-4), Graphics Interchange Format (GIF), MPEG Audio Layer-3 (MP3), JPEG (Joint Photographic Experts Group) interchange format (JIF), Bitmap, 3GP (an MPEG-4 video format used in mobile device), eXtensible Markup Language (XML), virtual card file (VCF), etc. A theme file containing the various pieces of multi-formatted information may be sent to the website via any appropriate wireless protocol such as, for example, multimedia messaging service (MMS), wireless application protocol (WAP), etc. This multi-formatted data may then be received at the server hosting the website and parts of the theme information parsed out and incorporated into appropriate parts of the website. For example, a GIF image file may be parsed from the theme file and used at the website as a background for the information displayed on the website. Depending on settings at the website, the background may be stretched, centered, tiled, etc. The website may incorporate all of the theme information or desired portions of the theme information from the theme file received. Therefore, a user has the ability to customize, express, and add their specific flavor to their websites, without having to log onto the website, by simply using a wireless device. The following is an example of two file types with theme information that may be parsed from a received theme file and used. Themes may contain an *.xml file where tags such as <Text Color="0xffffff"/> and <Desktop Color="0x000000"/> may be parsed, and incorporated thus setting the text color and desktop color on the website.

FIG. 1 shows a system for website theme changing using a mobile device according to an example embodiment of the present invention. The system 100 may include a mobile device 101 that may wirelessly transfer information via a wireless protocol (e.g., MMS, WAP, etc.) to a server 102 (e.g., a wireless device service provider). The server 102 may then transfer this information to a second server 103 via a network 104 (e.g., the Internet), where all or portions of the theme information may be incorporated into or onto a website 105 hosted by the second server 103. The wireless device may include a processor 106 and a memory 107. The memory 107 may contain an application 108 for performing website theme changing, stored information for one or more themes, each of which may contain one or more files or information containing associated theme information, and information regarding a website 110 that allows the application 108 to know how to send the theme information 109 to the website 105 hosted on the second server 103. A user may use the application 108 on the mobile device 101 to select a theme from the mobile device 101 to be incorporated in and/or on the website 105.

Figure 2:
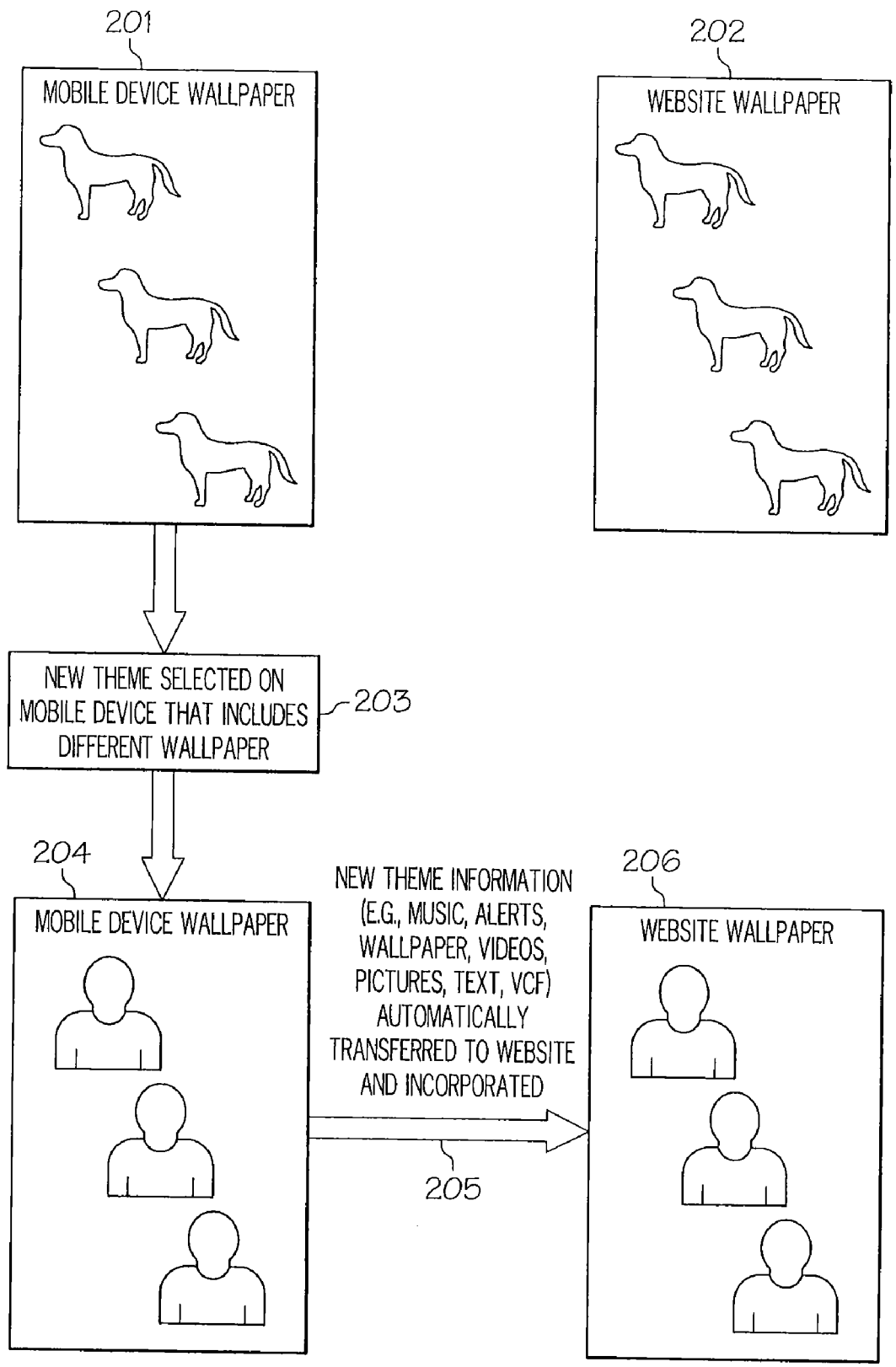
FIG. 2 is a diagram of selection of a new theme for a website on a mobile device according to an example embodiment of the present invention.

FIG. 2 shows a diagram of selection of a new theme for a website on a mobile device according to an example embodiment of the present invention. A mobile device may have a theme that is currently being used that includes a particular wallpaper or background 201 displayed on the mobile device. A website may contain or implement the same wallpaper 202 that is implemented on the mobile device. A user may select 203 a new theme on the mobile device that includes different wallpaper. The mobile device may then incorporate the new theme with the different wallpaper 204 to be displayed on the mobile device. The new theme information may then be automatically transferred 205 to the website and incorporated at the website. The website wallpaper 206 may then be identical to the mobile device wallpaper 204. The new theme information transferred to the website may include various types of information such as, for example, wallpaper, music, alerts, videos, pictures, text, virtual card file (VCF), etc.

Figure 3:
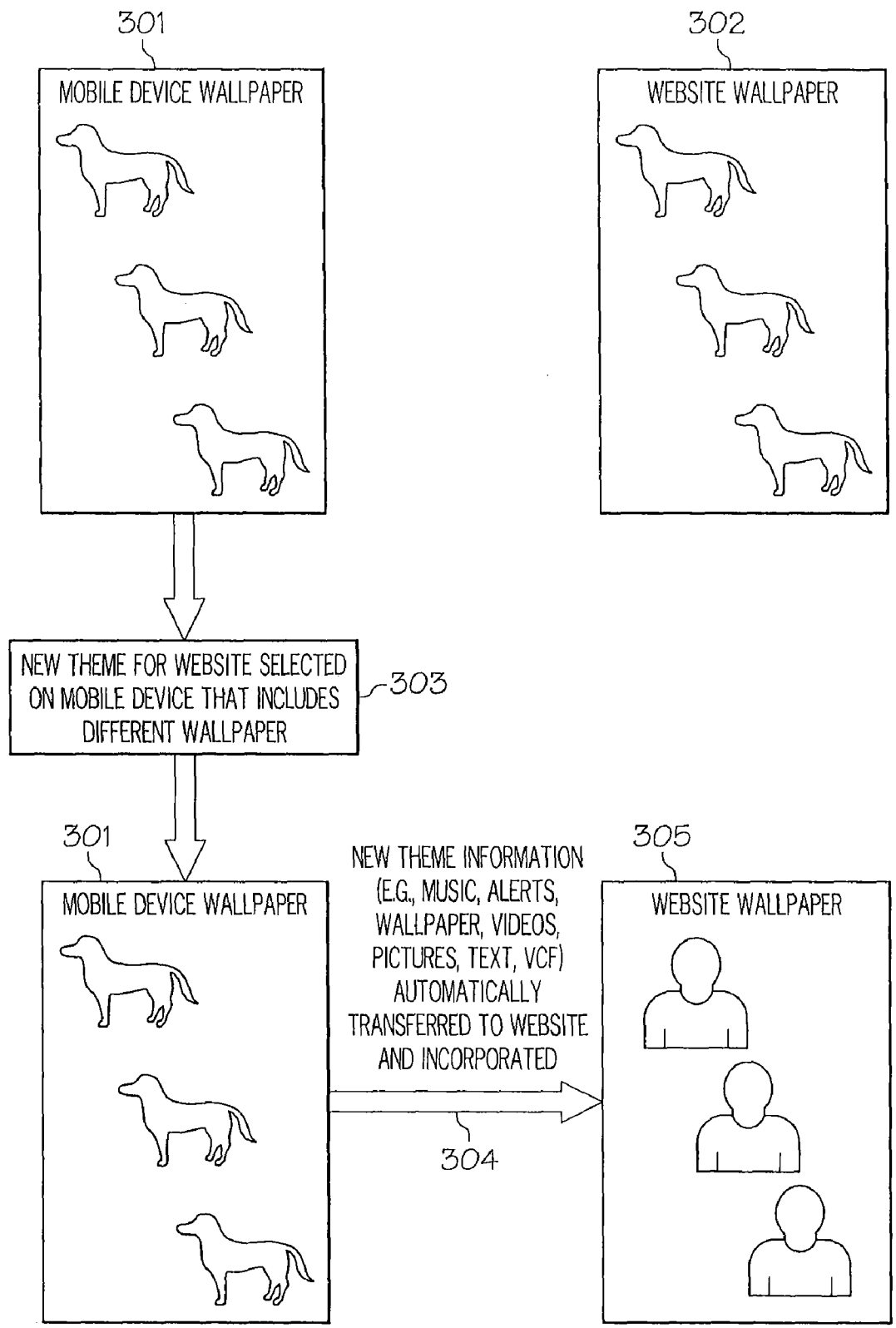
FIG. 3 is a diagram of selection of a new theme for a website on a mobile device according to another example embodiment of the present invention.

FIG. 3 shows a diagram of selection of a new theme for a website on a mobile device according to another example embodiment of the present invention. The mobile device may currently display a particular wallpaper 301. A website may display a wallpaper 302 that is identical to the wallpaper 301 displayed on the mobile device. The wallpaper 301 displayed on the mobile device and the wallpaper 302 displayed on the website may each be associated with a same theme file that may have been selected on the mobile device and transferred to the website. A new theme for the website may be selected 303 on the mobile device that includes different wallpaper. The mobile device wallpaper 301 that is displayed may not change; however, the new information may be automatically transferred 304 to the website and incorporated at the website. The website may now display a new wallpaper 305 associated with the new theme. Therefore, a user may select a different theme for the website only, while maintaining a current or different theme for the mobile device.

Figure 4:
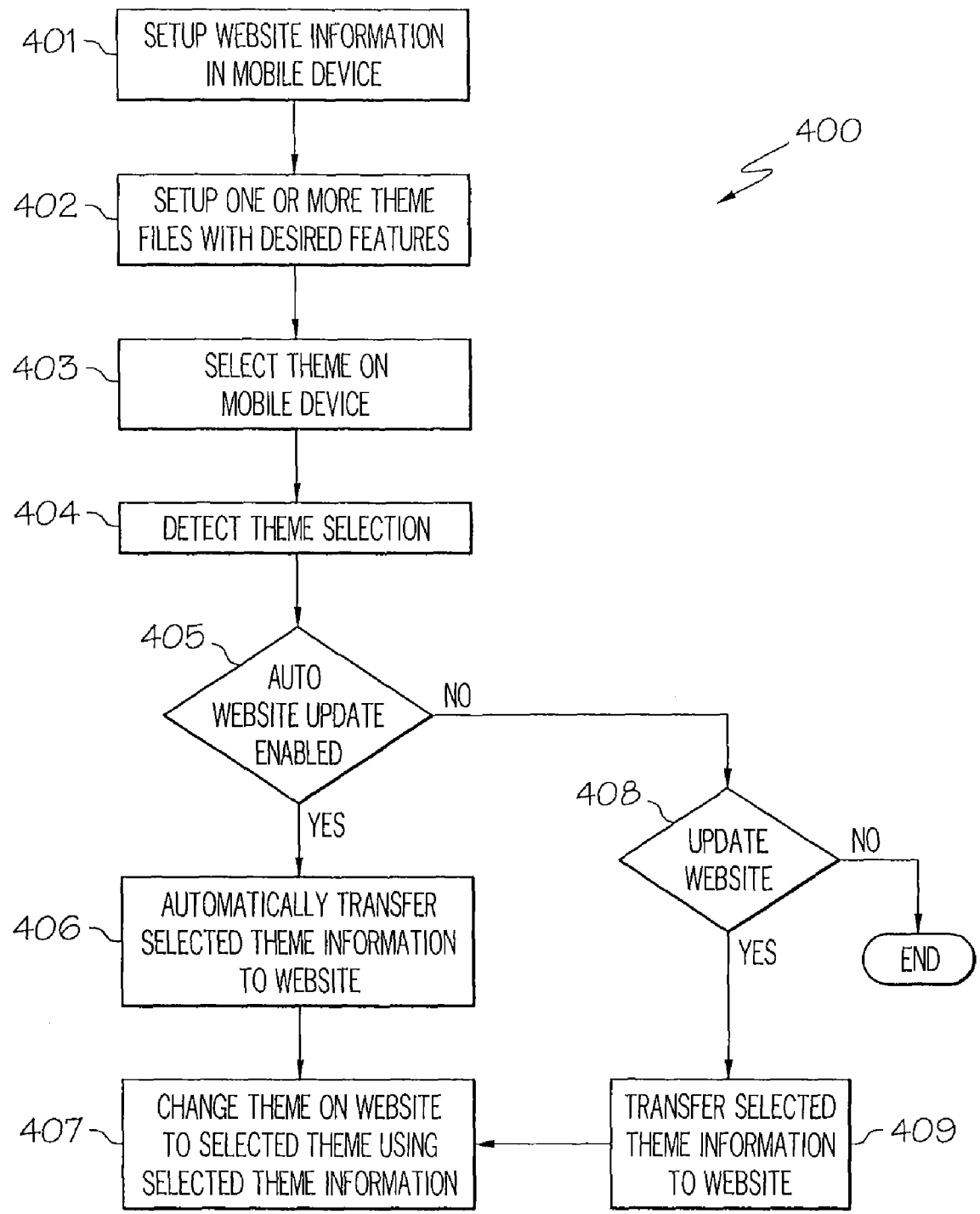
FIG. 4 is a flowchart of a process for website theme changing using a mobile device according to an example embodiment of the present invention.

FIG. 4 shows a flowchart of a process for website theme changing using a mobile device according to an example embodiment of the present invention. In the process 400, in block 401 website information may be set up in a mobile device. In block 402 one or more theme files, with desired features, may be set up on the mobile device. In block 403 a theme may be selected on the mobile device. In block 404 the theme selection may be detected. In block 405 it may be determined if automatic website updating is enabled and if so, in block 406 the selected theme information may be automatically transferred to a website. Then in block 407 the theme on the website may be changed to the selected theme using the transferred selected theme information. If automatic website updating is not enabled, then in block 408 it may be determined if it is desired to update the website and if not, the process ends. If it is desired to update the website, then in block 409 the selected theme information may be transferred to the website and in block 407 the theme on the website may be changed to the selected theme using the selected theme information. A menu or other user interface may be displayed on the mobile device allowing a user to manually select whether to update the website with the selected theme, if not done automatically.

Figure 5:
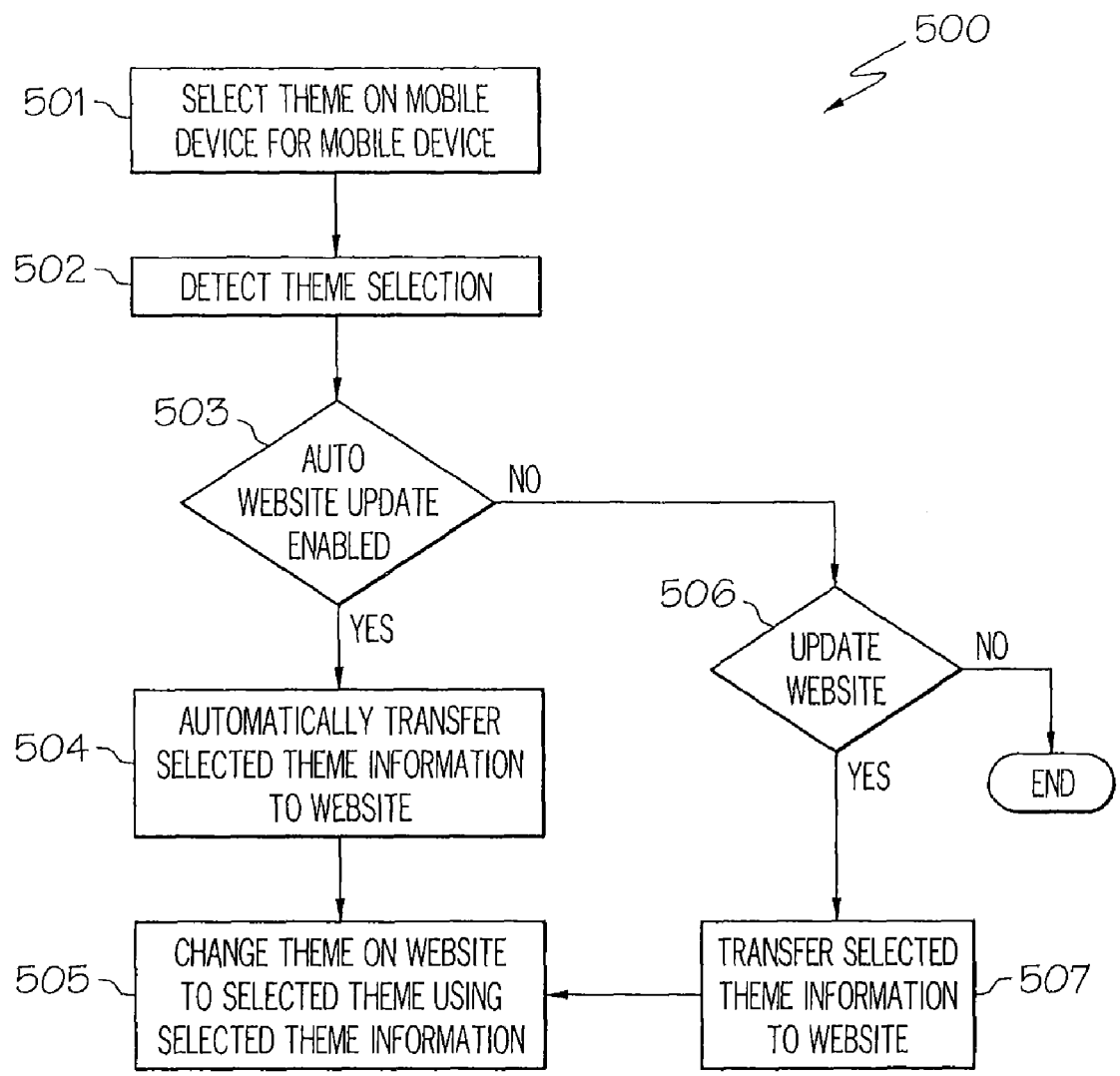
FIG. 5 is a flowchart of a process for changing a website theme to a theme of a mobile device according to an example embodiment of the present invention.

FIG. 5 shows a flowchart of a process for changing a website theme to a theme of a mobile device according to an example embodiment of the present invention. In the process 500, in block 501 a theme may be selected on the mobile device for use on the mobile device. In block 502 the new theme selection may be detected. In block 503 it may be determined if automatic website updating is enabled and if so, then in block 504 the selected theme information may be automatically transferred to a website. Then in block 505 the theme on the website may be automatically changed to the selected theme using the selected theme information. If automatic website updating is not enabled, then in block 506, it may be determined if it is desired to update the website with the new theme information, and if not, the process ends. If it is desired to update the website, then in block 507 the selected theme information may be transferred to the website and in block 505 the theme on the website may be changed to the selected theme using the selected theme information. A menu or other user interface may be displayed on the mobile device allowing a user to manually select whether to update the website with the selected theme, if not done automatically.

Figure 6:
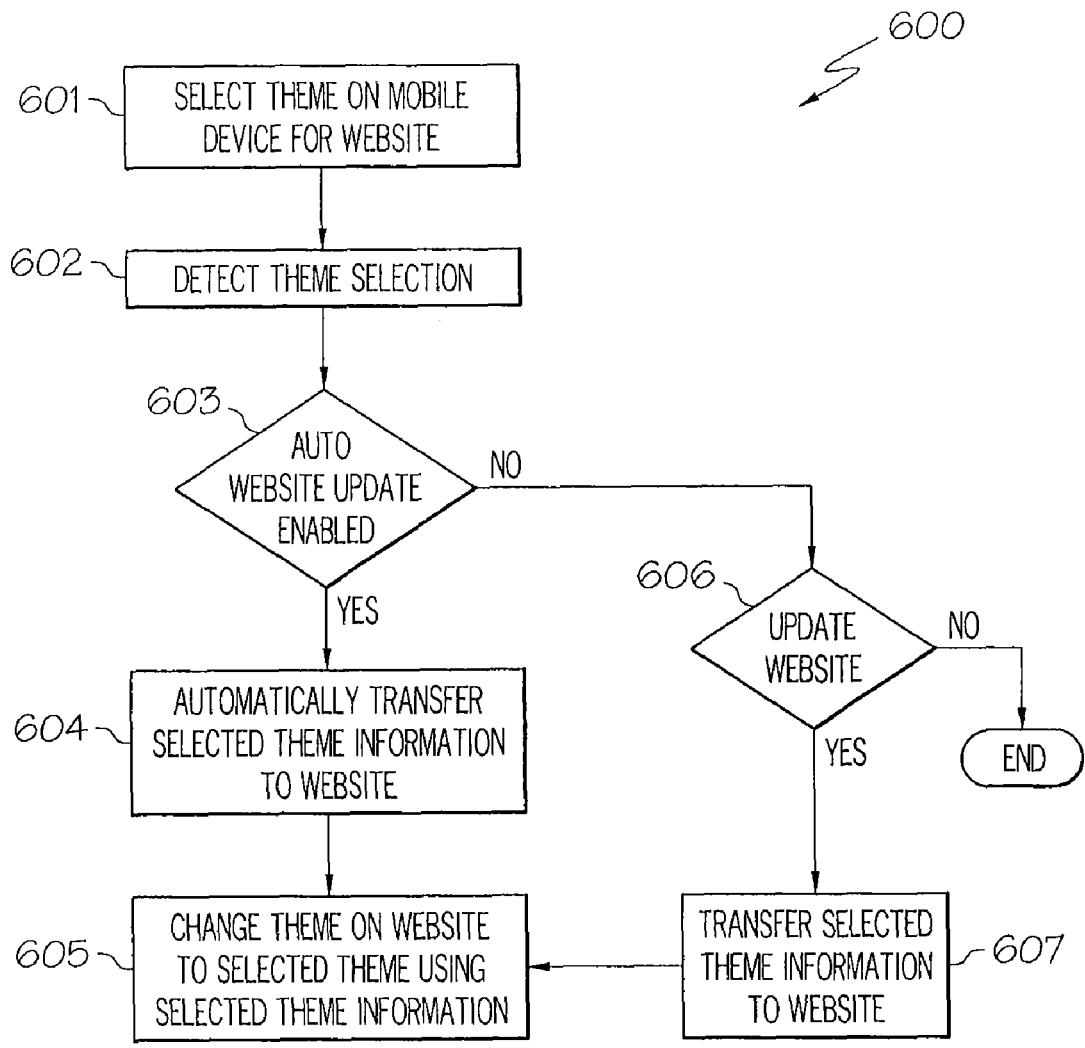
FIG. 6 is flowchart of a process for selecting a theme for a website on a mobile device according to an example embodiment of the present invention.

FIG. 6 shows flowchart of a process for selecting a theme for a website on a mobile device according to an example embodiment of the present invention. In the process 600, in block 601 a theme for a website may be selected on a mobile device. In block 602 the selection of the new theme may be detected. In block 603 it may be determined if automatic website updating has been enabled and if so, in block 604 the selected theme information may be automatically transferred to a website. Then in block 605 the theme on the website may be changed to the selected theme using the selected theme information. If it is determined that automatic website updating is not enabled, then in block 606 it may be determined if it is desired to update the website and if not, the process ends. If it is desired to update the website, then in block 607 the selected theme information may be transferred to the website and then in block 605 the theme on the website may be changed to the selected theme using the selected theme information. A menu or other user interface may be displayed on the mobile device allowing a user to manually select whether to update the website with the selected theme, if not done automatically.

Therefore, according to embodiments of the present invention, a theme may be selected for a mobile device on the mobile device and the theme automatically transferred and incorporated on a website. Further, a mobile device may be used to select a theme for a website and the theme incorporated in the website whereas a current theme on the mobile device remains the same or a different theme from that selected for the website.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A mobile device comprising:
a processor; and
a memory, the memory comprising an application configured for:
detecting a selection of a theme on the mobile device, wherein the selected theme is different from a current theme of the mobile device, the current theme being associated with a theme file that is associated with both a theme of a website and the current theme of the mobile device; and
sending, from the mobile device, a theme file to a web server that hosts the website in response to the selection of the theme on the mobile device, the theme file comprising one or more pieces of the selected theme;
wherein the theme of the website is changed to the selected theme, while the current theme of the mobile device is not changed to the selected theme.

2. The device according to claim 1, further comprising the processor transferring information related to the selected theme to the web server using multimedia messaging service (MMS), the theme of the website being changed to the selected theme using the information.

3. The device according to claim 1, further comprising the theme being selected from a plurality of themes on the mobile device.

4. The device according to claim 1, wherein the website comprises one of a blog site, a social networking site, or a personal website.

5. The device according to claim 1, further comprising the processor transferring information related to the selected theme to the web server using wireless application protocol (WAP), the theme of the website being changed to the selected theme using the information.

6. The device according to claim 1, wherein the selected theme comprises information related to at least one of music, alerts, wallpaper, text, videos, pictures, or virtual card file (VCF) information.

7. A method for changing a theme of a web site automatically comprising:
   selecting a theme on a mobile device, wherein the selected theme is different from a current theme of the mobile device, the current theme being associated with a theme file that is associated with both a theme of a website and the current theme of the mobile device; and
   sending, from the mobile device, a theme file to a web server that hosts the website in response to the selected theme being selected on the mobile device, the theme file comprising one or more pieces of the selected theme and the theme;
   wherein the theme of the website is changed to the selected theme, while the current theme of the mobile device is not changed to the selected theme.

8. The method according to claim 7, further comprising transferring information related to the selected theme to the web server using multimedia messaging service (MMS) and changing the theme of the website to the selected theme using the information.

9. The method according to claim 7, further comprising selecting the theme from a plurality of themes on the mobile device.

10. The method according to claim 7, wherein the mobile device comprises a mobile phone.

11. The method according to claim 7, wherein the website comprises one of a blog site, a social networking site, or a personal website.

12. The method according to claim 7, further comprising transferring information related to the selected theme to the web server using wireless application protocol (WAP) and changing the theme of the website to the selected theme using the information.

13. The method according to claim 7, further comprising changing the theme of the website to the selected theme using information related to the selected theme comprising at least one of music, alerts, wallpaper, text, videos, pictures, or virtual card file (VCF) information.

14. An apparatus comprising a non-transitory computer readable medium with instructions stored therein, the instructions when executed causing a mobile device to perform:
   selecting a theme on a mobile device, wherein the selected theme is different from a current theme of the mobile device, the current theme being associated with a theme file that is associated with both a theme of a website and the current theme of the mobile device; and
   sending, from the mobile device, a theme file to a web server that hosts the website in response to the selected theme being selected on the mobile device, the theme file comprising one or more pieces of the selected theme;
   wherein the theme of the website is changed to the selected theme, while the current theme of the mobile device is not changed to the selected theme.

15. The apparatus according to claim 14, further comprising performing transferring information related to the selected theme to the web server using multimedia messaging service (MMS) and changing the theme of the website to the selected theme using the information.

16. The apparatus according to claim 14, further comprising performing selecting the theme from a plurality of themes on the mobile device.

17. The apparatus according to claim 14, wherein the mobile device comprises a mobile phone.

18. The apparatus according to claim 14, wherein the website comprises one of a blog site, a social networking site, or a personal website.

19. The apparatus according to claim 14, further comprising performing transferring information related to the selected theme to the web server using wireless application protocol (WAP) and changing the theme of the website to the selected theme using the information.

20. The apparatus according to claim 14, further comprising performing changing the theme of the website to the selected theme using information related to the selected theme comprising at least one of music, alerts, wallpaper, text, pictures, videos or virtual card file (VCF) information.

* * * * *

UNITED STATES PATENT AND TRADEMARK OFFICE
CERTIFICATE OF CORRECTION

PATENT NO. : 8,140,108 B2
APPLICATION NO. : 11/955763
DATED : March 20, 2012
INVENTOR(S) : John E. Ang It is certified that error appears in the above-identified patent and that said Letters Patent is hereby corrected as shown below:

Column 7, line 18, delete "and the theme".

Signed and Sealed this
Eighth Day of May, 2012

David J. Kappos
*Director of the United States Patent and Trademark Office*